United States Patent
Ishioroshi et al.

(10) Patent No.: US 9,227,588 B2
(45) Date of Patent: Jan. 5, 2016

(54) STEERING WHEEL

(71) Applicant: NIHON PLAST CO., LTD., Fujinomiya-shi, Shizuoka (JP)

(72) Inventors: Daisuke Ishioroshi, Fujinomiya (JP); Tomotaka Ishikawa, Fujinomiya (JP); Kazuhiro Tono, Fujinomiya (JP)

(73) Assignee: NIHON PLAST CO., LTD, Fujinomiya (JP)

( * ) Notice: Subject to any disclaimer, the term of this patent is extended or adjusted under 35 U.S.C. 154(b) by 0 days.

(21) Appl. No.: 14/290,585

(22) Filed: May 29, 2014

(65) Prior Publication Data

US 2014/0353954 A1    Dec. 4, 2014

(30) Foreign Application Priority Data

May 30, 2013   (JP) .................................. 2013-114498

(51) Int. Cl.
- *B62D 1/11*   (2006.01)
- *B60R 21/2165*   (2011.01)
- *B62D 1/06*   (2006.01)

(52) U.S. Cl.
CPC ............ *B60R 21/21656* (2013.01); *B62D 1/06* (2013.01); *B62D 1/11* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,476,897 A | * | 11/1969 | De Vincent ................. | 200/61.57 |
| 5,152,551 A | * | 10/1992 | Sakane et al. ................. | 280/777 |
| 5,603,968 A | * | 2/1997 | Tajiri et al. ..................... | 425/556 |
| 5,630,617 A | * | 5/1997 | Hashiba ........................ | 280/731 |
| 6,082,758 A | * | 7/2000 | Schenck ..................... | 280/728.2 |
| 6,161,863 A | * | 12/2000 | Fujita et al. ................ | 280/728.2 |
| 6,485,050 B1 | * | 11/2002 | Simon et al. ................... | 280/731 |
| 6,508,143 B2 | * | 1/2003 | Ibe et al. ......................... | 74/552 |
| 6,568,704 B2 | * | 5/2003 | Iida et al. ................... | 280/728.3 |
| 6,626,458 B2 | * | 9/2003 | Fujita et al. ................ | 280/728.3 |
| 6,846,007 B2 | * | 1/2005 | Iida et al. ................... | 280/728.3 |
| 6,941,836 B2 | * | 9/2005 | Umemura et al. ............. | 74/552 |
| 7,293,794 B2 | * | 11/2007 | Clarke et al. .................. | 280/731 |

(Continued)

FOREIGN PATENT DOCUMENTS

| | | |
|---|---|---|
| DE | 19801514 B4 * | 8/2005 |
| EP | 2687413 A1 | 1/2014 |

(Continued)

OTHER PUBLICATIONS

Great Britain Search Report dated Nov. 21, 2014. Application No. GB 1409365.2.

*Primary Examiner* — Nicole Verley
(74) *Attorney, Agent, or Firm* — Arent Fox LLP

(57) ABSTRACT

The present invention aims to provide a steering wheel in which a decorative member is easily mounted and fixed to a steering main body without a need to employ fixing parts such as screws, and which is capable of effectively absorbing an impact by appropriately deforming the decorative member at the time of input of a load. The steering wheel of the present invention has: a plurality of engaging fixed units by which the decorative member is mounted and fixed to the steering main body's side via a fixing unit, and demounting of the fixing unit is restrained at the time of deformation of the decorative member; and an engaging unit which is arranged on a site configured to produce a bending deformation of the decorative member, and by which demounting is disallowed to be restrained at the time of deformation of the decorative member.

5 Claims, 8 Drawing Sheets

(56) References Cited

U.S. PATENT DOCUMENTS

| | | | |
|---|---|---|---|
| 7,654,563 B2 * | 2/2010 | Soderquist | 280/731 |
| 7,708,309 B2 * | 5/2010 | Kim et al. | 280/731 |
| 7,887,088 B2 * | 2/2011 | Worrell et al. | 280/731 |
| 7,891,699 B2 * | 2/2011 | Worrell et al. | 280/728.3 |
| 8,205,908 B2 * | 6/2012 | Matsu et al. | 280/728.2 |
| 8,210,565 B2 * | 7/2012 | Hayashi | 280/728.3 |
| 8,267,422 B2 * | 9/2012 | Sauer et al. | 280/728.3 |
| 8,919,812 B2 * | 12/2014 | Schutz | 280/731 |
| 8,984,988 B2 * | 3/2015 | Muramatsu | 74/552 |
| 2008/0100040 A1 * | 5/2008 | DePottey et al. | 280/728.2 |

FOREIGN PATENT DOCUMENTS

| | | |
|---|---|---|
| JP | 2008-296699 A | 12/2008 |
| JP | 2009-208571 A | 9/2009 |
| JP | 2010-254198 A | 11/2010 |
| JP | 2012-144076 A | 8/2012 |
| JP | 2013-237313 A | 11/2013 |
| JP | 2014-031092 A | 2/2014 |

* cited by examiner

STEERING WHEEL

CROSS REFERENCE TO RELATED APPLICATIONS

This application claims priority of Japanese Patent Application No. 2013-114498 filed on May 30, 2013. The contents of this application are incorporated herein by reference in their entirety.

BACKGROUND OF THE INVENTION

1. Field of the Invention

The present invention relates to a steering wheel in which a decorative member made of a synthetic resin is mounted and fixed to a steering main body, and in particular, to a steering wheel which is superior in mounting property of a decorative member, and which is capable of appropriately deforming when the steering wheel is subjected to a load.

2. Description of the Related Art

In general, a steering wheel of an automobile has a steering main body which is constructed in such a manner that a boss portion and a circular ring-shaped rim portion to be coupled to a sheering shaft are coupled by way of a plurality of spoke portions. In addition, an air bag device is attached to the boss portion of the steering main body, and a pad portion having a horn mechanism is mounted so as to cover the airbag device.

Further, at the periphery of the pad portion, a decorative member (which may also be referred to as a garnish or an ornament) is mounted so as to cover the spoke portions of the steering main body, and a design property of the steering wheel is enhanced by this decorative member. Moreover, a stepped difference between the rim portion and the pad portion of the steering main body is reduced, whereby operability or operational stability of the steering wheel may also be improved.

An example of the steering wheel to which such a decorative member has been mounted is described in Japanese Unexamined Patent Application Publication No. 2012-144076, for example.

The steering wheel described in Japanese Unexamined Patent Application Publication No. 2012-144076 is constructed in such a manner that a decorative member (an ornament) is mounted to a steering main body. The steering main body is provided with: a circular ring-shaped rim portion; a boss portion (a hub portion) which is arranged at a center part of the rim portion; a plurality of spoke portions configured to couple the rim portion and the boss portion to each other.

Also, the decorative member has: one pair of left and right first and second decorative members; and a third decorative member which is assembled and fixed between the first and second decorative members. In addition, the first to third decorative members are respectively formed by way of insertion molding of a synthetic resin, and the left and right side edge parts of the third decorative member are slidably inserted into, and are engaged with, an opposite side edge part of the first decorative member and an opposite side edge part of the second decorative member, whereby an assembled decorative member in which the first decorative member to the third decorative member have been integrally assembled with each other is constructed.

In particular, in so far as the assembled decorative member in Japanese Unexamined Patent Application Publication No. 2012-144076 is concerned, an opposite end face which forms a gap between the first decorative member and third decorative member and an opposite end face which forms a gap between the second decorative member and the third decorative member are constructed so as to be inclined faces, both of which are obliquely disposed so as to cross each other with respect to the line of sight of a driver who faces a front side with respect to the steering wheel.

Such an assembled decorative member in Japanese Unexamined Patent Application Publication No. 2012-144076, in its entire shape, forms a substantial Y-shape in a planar view, and is mounted and fixed to the steering main body so as to follow an outer circumferential part of the pad portion in the steering wheel.

In this case, on a back face of the assembled decorative member, a plurality of lattice-shaped reinforcement ribs and a mounting and fixing portion which are coupled to the reinforcement ribs are integrally formed with the assembled decorative member; the assembled decorative member is positioned by way of an engaging lock pin or the like with respect to the spoke portions of the steering main body; and by way of screw tightening, the mounting and fixing portion that is provided on the back face of the assembled decorative member is secured and fixed to a mounting base which is formed at the spoke portions.

In so far as the assembled decorative member in Japanese Unexamined Patent Application Publication No. 2012-144076 is concerned, securing and fixing exerted by screw tightening is utilized, as described previously, as a unit configured to fix the decorative member (the assembled decorative member) to the steering wheel. In this way, in the conventional steering wheel, in order to fix the steering main body and the decorative member to each other, in general, the decorative member is fixed to the steering main body by employing fixing parts such as screws, machine screws, or bolts.

However, in a case where the decorative member is thus fixed to the steering main body by employing the fixing parts such as screws or machine screws, the number of parts increases, and therefore, there has been a case in which management of parts becomes complicated, or alternatively, there has been a case in which the assembling process of the steering wheel becomes complicated.

In addition, in a case where the decorative member is fixed by employing the fixing parts such as screws or machine screws, there is a need to provide a mounting and fixing portion for mounting the fixing parts on the decorative member, and however, there has been a case in which a setup position of the mounting and fixing portion is limited in consideration of the assembling work or the like of the steering wheel. Further, in a case where the decorative member is designed so as to be formed in an elongated shape, for example, there has been a case in which it becomes difficult to provide the mounting and fixing portion on the decorative member, or alternatively, there has been a case in which it becomes difficult to carry out the assembling work.

In a case where the fixing parts such as screws or machine screws are thus employed, the degree of freedom in design of the steering wheel is often lowered, and therefore, it is desired to employ a unit configured to fix the decorative member to the steering main body without a need to employ the fixing parts.

On the other hand, the steering wheel is constructed so as to absorb and mitigate an impact which is applied to a driver or the like, by deforming the steering wheel when the steering wheel is subjected to an input of a load exerted by a driver or the like from a driver's seat, for example, at the time of collision of an automobile or the like.

Thus, it is desirable that the steering wheel be constructed so that the amount of deformation of the steering wheel (in particular, the amount of deformation of the steering main body) is as large as possible in order to enhance the relevant impact absorption performance, and however, in a case where the decorative member is fixed to the steering main body by employing the fixing parts such as screws or machine screws, as described previously, deformation of the steering main body is restrained by the decorative member, depending on the setup position of the mounting and fixing portion in the decorative member or the mounting portion of the fixing parts.

Thus, in the conventional art, even if the decorative member is fixed to the steering main body by employing the fixing parts, a design of the decorative member is made in such a manner that deformation of the steering main body is restrained, thus resulting in a further lowering of the degree of freedom in design of the steering wheel, and for example, there has been a case in which it becomes difficult to design the decorative member so as to be formed in a narrow elongated shape, or alternatively, there has been a case in which it becomes difficult to make a difference in external view of the steering wheel or to enhance its related design property.

On the other hand, if an attempt is made to form an elongated design portion as a decorative member by way of painting, for example, there is a need to provide masking or the like for the sake of painting, or alternatively, it takes long for such painting to dry, thus resulting in higher costs, and in the case of such painting, it is difficult to produce a sharp sense of feeling in external view.

SUMMARY OF THE INVENTION

The present invention has been made in view of the conventional problem described above, and it is a specific object of the present invention to provide a steering wheel which is capable of easily mounting and fixing a decorative member to a steering wheel without a need to employ fixing parts such as screws or machine screws and ensures operability or operational stability, and which is capable of effectively absorbing an impact when a load is input, by appropriately deforming the decorative member so as to follow the steering main body, and further is capable of enhancing the degree of freedom in design.

In order to achieve the foregoing object, a steering wheel according to a first aspect of the present invention is a steering wheel having the following essential constituent elements:

a steering main body which is coupled to a steering shaft; and at least one decorative member which is mounted and fixed to an occupant opposite face side of the steering main body so as to cover a part of the steering main body, the steering wheel being most primarily provided in such a manner that the decorative member has a desired shape and is constructed so as to be deformable due to a load, and is mounted and fixed via a fixing unit to the steering wheel main body's side in a mounting and demounting direction which is substantially orthogonal to a steering face of the steering main body, the fixing unit has a plurality of engaging fixed units by which demounting of the decorative member is restrained at a time of deformation of the decorative member and an engaging unit by which demounting of the decorative member is disallowed to be restrained at the time of deformation of the decorative member, and the engaging unit is sandwiched between the engaging fixed unit, and is arranged on a site on which a bending deformation is caused to take place with the decorative member when a load is input to the steering main body and then a deformation takes place.

In the steering wheel according to a second aspect of the present invention, it is preferable that the engaging fixed unit have: a mounting and demounting direction restraining portion configured to restrain at least a movement of the decorative member in the mounting and demounting direction; and an orthogonal direction restraining portion which is arranged in proximity to the mounting and demounting direction restraining portion, and which is configured to restrain the movement of the decorative member in the mounting and demounting direction.

In the steering wheel according to a third aspect of the present invention, it is preferable that the mounting and demounting direction restraining portion be made of: an engaging fixed piece portion which is protrusively provided toward the decorative member in a direction which is substantially orthogonal to the mounting and demounting direction; and an engaging fixed recessed portion or an engaging fixed hole portion which is formed on the steering main body's side, and which is configured to hook and engagingly fit the engaging fixed piece portion.

In the steering wheel according to a fourth aspect of the present invention, it is preferable that the orthogonal direction restraining portion be made of: an L-shaped protrusion piece portion forming a substantial L-shape in a cross section in a direction which is orthogonal to the mounting and demounting direction; and an L-shaped groove portion which is punched on the steering main body's side, and which is configured to engage the L-shaped protrusion piece portion therein.

Further, in the steering wheel according to a fifth aspect of the present invention, it is preferable that the engaging unit be made of: a plate-shaped protrusion piece portion which protrudes from an opposite face opposing to the steering main body of the decorative member toward the steering main body; and a hole portion which is punched on the steering main body's side, and by which demounting of the plate-shaped protrusion piece portion in the mounting and demounting direction is disallowed to be restrained.

The steering wheel according to any one of the first to fifth aspects of the present invention has a steering main body and at least one decorative member which is mounted and fixed to the steering main body's side via a fixing unit, wherein the decorative member has a desired shape, and is constructed so as to be deformable due to a load.

In any one of the first to fifth aspects of the present invention, a case in which the decorative member is fixed to the steering main body's side includes not only a case in which the decorative member is directly mounted and fixed to the steering main body but also a case in which the decorative member is mounted to another member which is attached to the steering main body, whereby the decorative member is indirectly mounted and fixed via such another member.

In addition, the fixing unit configured to fix the decorative member to the steering main body's side is made of: a plurality of engaging fixed units by which demounting of the decorative member is restrained at the time of deformation of the decorative member; and an engaging unit by which demounting of the decorative member is disallowed to be restrained at the time of deformation of the decorative member.

With such a steering wheel according to any one of the first to fifth aspects of the present invention, the decorative member can be mounted and fixed to the steering main body's side in a direction which is substantially orthogonal to a steering face of the steering main body by way of a plurality of engaging fixed units and at least one engaging unit without a need to employ fixing parts such as screws or machine screws.

The fixing parts such as screws or machine screws are thus eliminated, whereby the number of parts of the steering wheel can be reduced and thus management of parts is simplified, and the assembling work of the steering wheel can be easily carried out.

In addition, the fixing parts such as screws or machine screws are eliminated, whereby there is no need to provide a mounting and fixing portion for mounting the fixing parts to the decorative member and thus the degree of freedom in design of the steering wheel is enhanced, and for example, it becomes possible to design the decorative member so as to be formed in a narrow elongated shape and then mount and fix it to the steering main body's side. In this manner, it becomes possible to make a difference by differentiating the appearance of the steering wheel from that of the conventional steering wheel, or alternatively, to easily enhance the design property of the steering wheel.

Moreover, according to any one of the first to fifth aspects of the present invention, a fixing strength of the decorative member with respect to the steering main body is not only stably ensured by way of the engaging fixed unit, and a fixed state of the decorative member can also be stably maintained by way of the engaging fixed unit, thereby making it possible to stably ensure a superior operability or operational stability of the steering wheel.

Further, any one of the first to fifth aspects of the present invention, it is preferable that an engaging unit be sandwiched between predetermined sites with respect to engaging fixed units, that is, between two engaging fixed units, and be provided on a site on which a bending deformation is caused to take place with the decorative member when the steering main body is deformed by way of input of a load, and, for example, the engaging unit be provided at a center part which is sandwiched between end parts of the decorative member. In this manner, the decorative member can be deformed so as to follow the steering main body at the time of deformation of the steering main body, thus making it possible to prevent deformation of the steering main body from being restrained.

In the steering wheel according to any one of the first to fifth aspects of the present invention, an engaging fixed unit has a mounting and demounting direction restraining portion configured to restrain at least a movement of the decorative member in the mounting and demounting direction and an orthogonal direction restraining portion configured to restrain the movement of the decorative member in the mounting and demounting direction. With such an engaging fixed unit, the decorative member can be fixed so as to be engagingly fitted to the steering main body's side in a demountable manner, and therefore, the decorative member can be fixed to the steering main body without a need to employ fixing parts such as screws or machine screws. In addition, at the time of deformation of the steering wheel, deformation of the decorative member is capable of following deformation of the steering main body.

In this case, the mounting and demounting direction restraining portion of the engaging fixed unit is made of: a claw-shaped engaging fixed piece portion which is punched toward the decorative member in a direction which is substantially orthogonal to the mounting and demounting direction; and an engaging fixed recessed portion or an engaging fixed hole portion configured to hook and engagingly fit the engaging fixed piece portion, whereby the mounting and demounting direction restraining portion can be easily formed with a simple structure, and a burden associated with its related manufacturing costs can be reduced.

In addition, the orthogonal direction restraining portion of the engaging fixed unit is made of: an L-shaped protrusion piece portion which protrudes from an opposite face opposing to the steering main body of the decorative member toward the steering main body, and forms a substantial L-shape in a cross section in a direction which is orthogonal to the mounting and demounting direction; and an L-shaped groove portion which is punched on the steering body's side and is configured to engage the L-shaped protrusion piece portion therein, whereby the orthogonal direction restraining portion can be easily formed with a simple structure, and a burden associated with its related manufacturing costs can be reduced.

Further, according to any one of the first to fifth aspects of the present invention, the engaging unit is made of: a plate-shaped protrusion piece portion which protrudes from an opposite face opposing to the steering main body of the decorative member toward the steering main body; and a hole portion which is punched on the steering main body's side and by which demounting of the plate-shaped protrusion piece portion is disallowed to be restrained in the mounting and demounting direction, whereby the engaging unit can be easily formed with a simple structure, and a burden associated with its related manufacturing costs can be reduced.

DESCRIPTION OF THE PREFERRED EMBODIMENTS

Hereinafter, with reference to the accompanying drawings, preferred embodiments of the present invention will be described in detail by way of example. It is to be noted that the present invention is not limited to the embodiments which will be described below, and a variety of modifications to the described embodiments can occur without departing from the scope and spirit of the invention, as long as they have constituent elements which are substantially identical to those of the present invention and attaints like functions and advantageous effects.

For example, although the following embodiments primarily describe a case in which a second decorative member is mounted to a first decorative member to be attached to a steering main body, whereby via the first decorative member the second decorative member is indirectly mounted and fixed to the steering main body, the present invention can also be similarly applied to a steering wheel in which a single decorative member is directly mounted and fixed to the steering main body, for example. In addition, in the present invention, the shape and size of the steering main body or each of the decorative members can be arbitrarily changed.

[First Embodiment]

Figure 1:
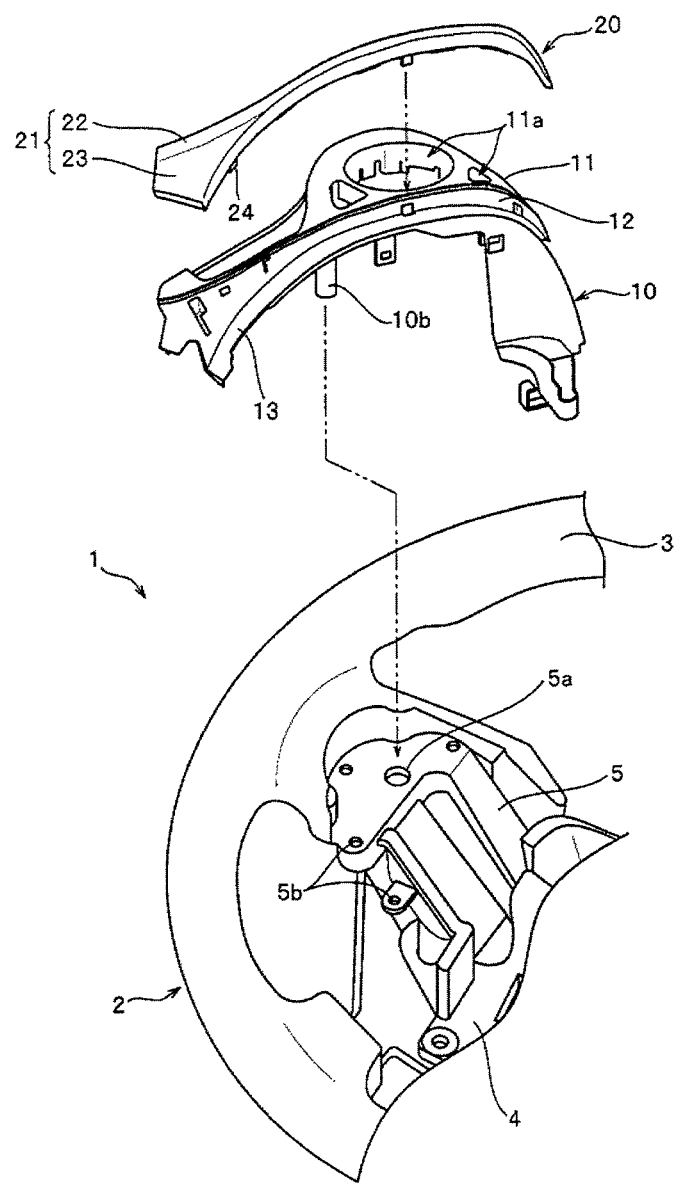
FIG. 1 is an exploded perspective view of essential portions showing the essential portions of a steering wheel according to the present invention in an exploded manner.
Figure 2:
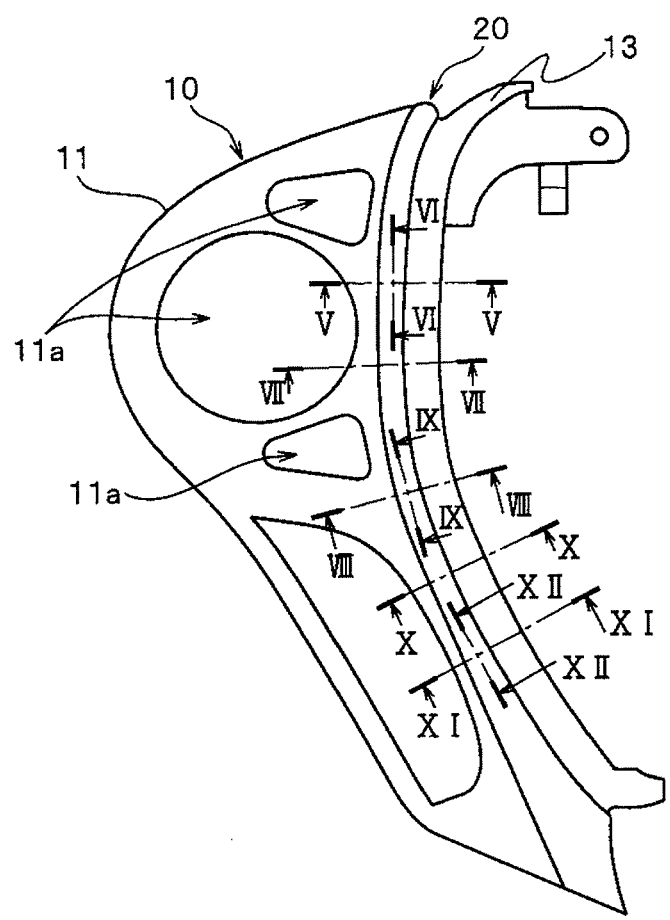
FIG. 2 is a front view showing a state in which a second decorative member is mounted and fixed to a first decorative member of the steering wheel.
Figure 3:
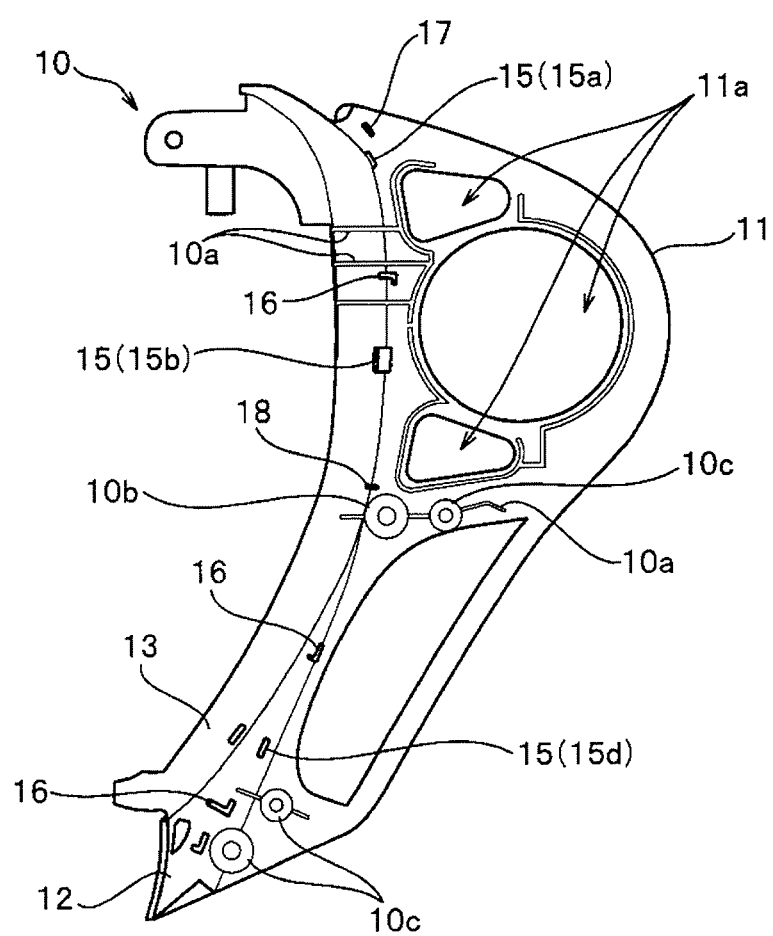
FIG. 3 is a rear view showing the first decorative member of the steering wheel.
Figure 4:
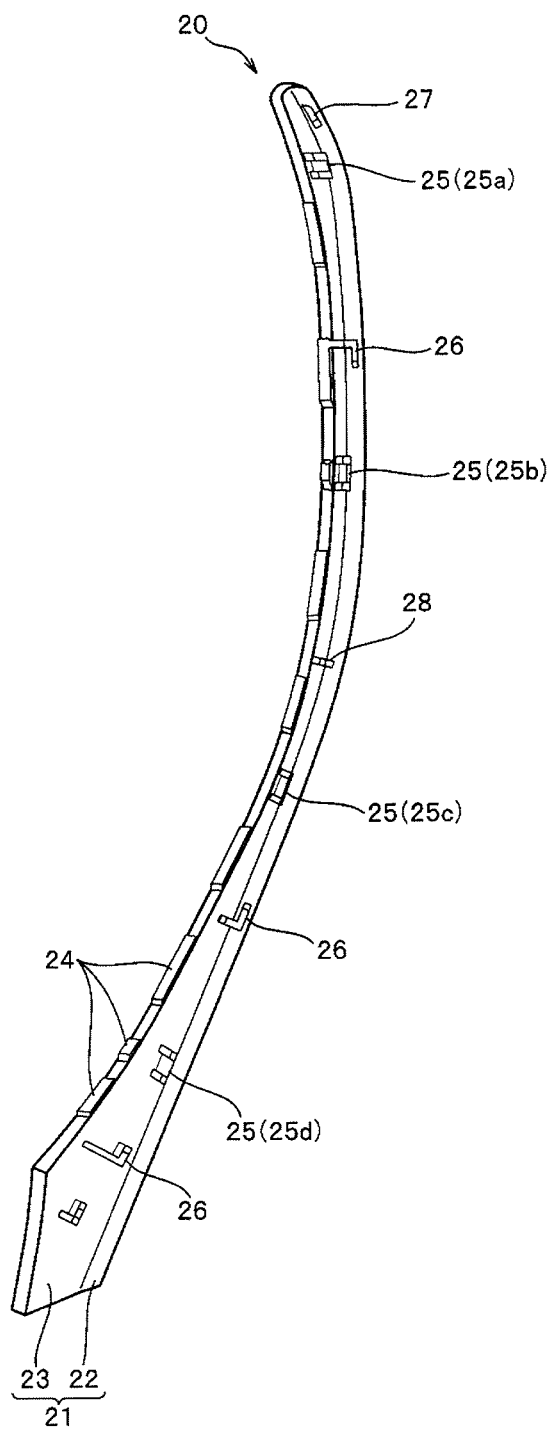
FIG. 4 is a rear view showing the second decorative member of the steering wheel.
Figure 5:
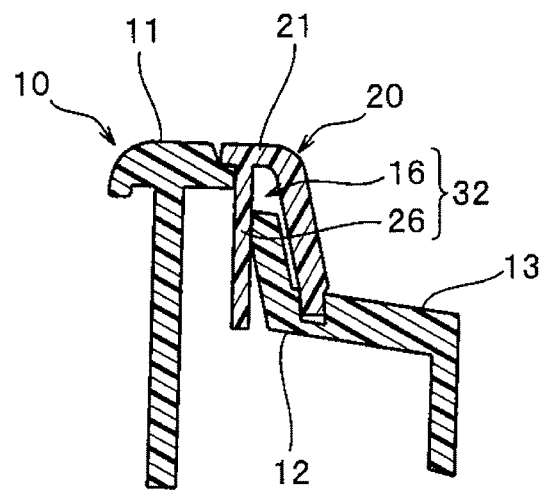
FIG. 5 is a sectional view showing a cross section taken along the line V-V shown in FIG. 2.
Figure 6:
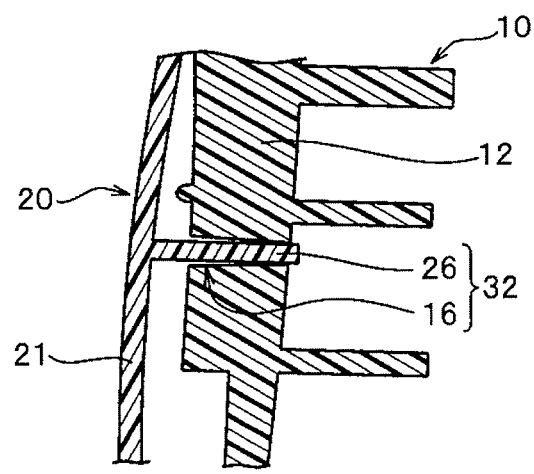
FIG. 6 is a sectional view showing a cross section taken along the line VI-VI shown in FIG. 2.

FIG. 1 is an exploded perspective view of essential portions showing the essential portions of a steering wheel according to the present invention in an exploded manner. FIG. 2 is a front view showing a state in which a second decorative member is mounted and fixed to a first decorative member of the steering wheel. In addition, FIG. 3 and FIG. 4 are rear views respectively showing the first decorative member and the second decorative member.

A steering wheel 1 of the first embodiment is mounted to a steering shaft which is positioned in front of a driver's seat of an automobile, and a steering face of the steering wheel 1 is rotatably arranged in a state in which the steering face is inclined at a predetermined angle with respect to a face which is orthogonal to a forward and backward direction of the automobile so that an upper end part thereof is positioned so as to be more forward than a lower end part.

The steering face is hereinafter referred to as a phantom plane which is formed by an entire circumference of a rim portion 3 in the steering wheel 1. It is to be noted that in the following description, the forward and backward direction designates a direction which is orthogonal to the steering face, and in particular, a direction on a driver's seat with respect to the steering face is defined as a forward direction, and a direction on a side on which a steering shaft is arranged with respect to the steering face is defined as a backward direction.

In addition, a vertical direction designates a direction which is parallel to the steering face, and which is faithfully taken along a vertical direction of a vehicle, and a transverse direction designates a direction which is parallel to the steering face, and which is faithfully taken along a transverse direction of the vehicle.

The steering wheel 1 of the first embodiment has: a steering main body 2; an airbag device, although not shown, which is attached to a front face side of a center part (a boss portion 4 which will be described later) of the steering main body 2; a pad portion, although not shown, which is attached to the steering main body 2 so as to cover a lower spoke portion 5 which will be described later, of the airbag device and the steering main body 2; first left and right decorative members (first garnishes) 10 which are arranged on both left and right sides of the pad portion, and which are configured to cover left and right spoke portions 5 which will be described later, of the steering main body 2; and left and right second decorative members (second garnishes) 20, each of which is mounted and fixed to a front face side of the first decorative member 10. In addition, the pad portion is provided with a horn mechanism therein.

It is to be noted that in the first embodiment, an airbag device and a pad portion, although not shown, are constructed so as to be basically identical to an airbag device and a pad portion employed in a conventional general steering wheel and thus a detailed description of these constituent elements is omitted herein.

In addition, the left side first and second decorative members 10, 20 and the right side first and second decorative members 10, 20 are formed so as to be transversely symmetrical to each other, and are respectively mounted to both left and right sides of the pad portion. Thus, in the following description, in order to avoid a duplicate description related to the left and right first and second decorative members 10, 20, its related description will be given focusing on the first and second decorative members 10, 20 which are mounted to the left side of the pad portion.

The steering main body 2 of the first embodiment has: a circular ring-shaped rim portion 3; a boss portion 4 which is arranged at a substantial center part of the rim portion 3; and three spoke portions 5 configured to couple the rim portion 3 and the boss portion 4 to each other. It is to be noted that in the first embodiment, when the steering main body 2 in a state in which the steering wheel 1 is held at a neutral position is seen from a front side, the three spoke portions 5 are arranged so as to be formed in a substantial Y-shape. In addition, the spoke portions 5 that are extensively provided from the boss portion 4 toward the left side and the right side respectively defined as a left spoke portion 5 and a right spoke portion 5, and a spoke portion 5 which is extensively provided from the boss portion 4 toward a lower side is defined as a lower spoke portion 5.

This steering main body 2 has: a cored bar serving as a skeleton made by employing a metal material such so iron, aluminum, or magnesium; and a surface portion which is arranged so as to cover a cored bar constituting a part of the rim portion 3 and the spoke portion 5, and which is made of a synthetic resin such as a foamed urethane. Further, in so far as the steering main body 2 is concerned, it is also possible to wind real leather around the surface portion or apply decoration in order to enhance a design property of the steering wheel 1.

In addition, in the left and right spoke portions 5 of the steering main body 2, mounting holes 5a configured to insert and fix an engaging protrusion portion 10b which will be described later, of the first decorative member 10, is punched, and further, in the boss portion 4 and the left and right spoke portions 5, a plurality of screw holes 5b configured to fix the first decorative member 10 by employing screws are formed.

The first decorative member 10 that is mounted and fixed to this steering main body 2 is made of a synthetic resin having a deformable property such as a polycarbonate resin, an ABS resin, and a mixture resin of the polycarbonate resin and the ABS resin, for example, and for example, as shown in FIG. 2 and FIG. 3, this decorative member, in its entirety, has a desired shape which slightly curves in a forward and backward direction from an upper end part toward a lower end part thereof.

On a back face side of this first decorative member 10, there are provided: a reinforcement rib 10a configured to reinforce the first decorative member 10; an engaging protrusion portion 10b to be inserted into a mounting hole 5a which is punched in the spoke portion 5 of the steering main body 2; and s screw mounting portion 10c arranged so as to correspond to a position of a screw hole 5b which is formed in each of the boss portion 4 and the spoke portion 5 of the steering main body 2.

In addition, the first decorative member 10 has: a first decorative main body portion 11 which is exposed to the outside when the steering wheel 1 is assembled; a mounting portion 12 for the second decorative member 20, which is arranged so as to be more inward than the first decorative main body portion 11 (on the pad portion's side); and an inside extension portion 13 extending so as to be more inward than the mounting portion 12 (on the pad portion's side).

In the first decorative main body portion 11 of the first decorative member 10, a plurality of opening portions 11a are formed. In each of these opening portions 11a, at the time of assembling the steering wheel 1, for example, an operating portion configured to operate a variety of vehicle-mounted devices such as an audio device, a navigation device, a vehicle-mounted telephone set, or an automobile gear change device is mounted.

The mounting portion 12 of the first decorative member 10 is formed along the inside of the first decorative main body portion 11 so as to be associated with the shape of the second decorative member 20. In this mounting portion 12, there are formed: four engaging fixed portions 15 configured to hook and engagingly fit an engaging fixed piece portion 25 which will be described later, of the second decorative member 20; three L-shaped groove portions 16 configured to engage an L-shaped protrusion piece portion 26 which will be described later, of the second decorative member 20 therein; one insertion hole portion 17 which is arranged at an upper end part of the mounting portion 12, and which is configured to insert a first plate-shaped protrusion piece portion 27 which will be described later, of the second decorative member 20; and one second insertion hole portion 18 which is arranged at a substantial center part of a vertical direction of the mounting portion 12, and which is capable of inserting and removing a second plate-shaped protrusion piece portion 28 which will be described later, of the second decorative member 20.

In the mounting portion 12 of the first embodiment, the four engaging fixed portions 15 configured to engagingly fit the engaging fixed piece portion 25 of the second decorative member 20 are provided at intervals which are substantially equal to each other in a vertical direction. In this case, the four engaging fixed portions 15 are referred to as a first engaging fixed portion 15a to a fourth engaging fixed portion 15d in sequential order from the engaging fixed portion 15 that is arranged at the uppermost side toward a lower side.

In addition, in the first embodiment, two engaging fixed portions, in other words, a first engaging fixed portion 15a and a second engaging fixed portion 15b which are arranged on the upper side are respectively made of engaging fixed hole portions which are punched so as to penetrate from a top face (front face) side to a back face (rear face) side of the mounting portion 12, and two other engaging fixed portions, in other words, a third engaging fixed portion 15c and a fourth engaging fixed portion 15d which are arranged on a lower side are respectively made of engaging fixed recessed portions which are recessed on a top face side of the mounting portion 12.

The three L-shaped groove portions 16 in the first embodiment are respectively arranged in proximity to an upper side of the second engaging fixed portion 15b, in proximity toward a lower side of the third engaging fixed portion 15c, and in proximity toward a lower side of the engaging fixed portion 15d, and each of the L-shaped groove portions 16 is punched so that a cross section which is orthogonal to the forward and backward direction is formed in a substantial L-shape from a front face side of the mounting portion 12 toward a rear side thereof.

In this case, each of the L-shaped groove portions 16 is formed in an L-shape by: a lateral groove portion which is formed along a widthwise direction of the mounting portion 12; and a longitudinal groove portion which is formed along a lengthwise direction of the mounting portion 12, and in particular, the L-shaped groove portion 16 that is in proximity to the second engaging fixed portion 15b that is arranged in a region on an upper side of the mounting portion 12, is formed in an L-shape in an orientation such that the longitudinal groove portion extends from the lateral groove portion toward a lower side thereof. On the other hand, the L-shaped groove portion 16 that is in proximity to the third engaging fixed portion 15c that is arranged in a region on the lower side of the mounting portion 12 and the L-shaped groove portion 16 that is in proximity to the fourth engaging fixed portion 15d each are formed in an L-shape in an orientation such that the longitudinal groove portion extends from the lateral groove portion to an upper side thereof.

The first insertion hole portion 17 in the first embodiment is punched in proximity to the upper side of the first engaging fixed portion 15a from the front face side of the mounting portion 12 to a rear side thereof, and a cross section which is orthogonal to the forward and backward direction of the first insertion hole portion 17 forms an elongated shape in the lengthwise direction of the mounting portion 12.

The second insertion hole portion 18 in the first embodiment is punched in a neutral position between the second engaging fixed portion 15b and the third engaging fixed portion 15c from the front face side of the mounting portion 12 to a rear side thereof, and a cross section which is orthogonal to the forward and backward direction of the second insertion hole portion 18 forms an elongated shape in the widthwise direction of the mounting portion 12. In particular, the second insertion hole portion 18 of the first embodiment is arranged at a substantial center part of the forward and backward direction in the mounting portion 12 of the first decorative member 10. In addition, on the top face side of the mounting portion 12 of the first embodiment, there are formed a plurality of engaging recessed portions and engaging hole portions, although not shown, which are configured to engage a positioning protrusion portion 24 which will be described later, of the second decorative member 20.

On the other hand, although the second decorative member 20, as is the case with the first decorative member 10, is made of a synthetic resin having a deformable property such as a polycarbonate resin, an ABS resin, and a mixture resin of polycarbonate resin and ABS resin, this decorative member is formed separately from the first decorative member 10. In addition, the second decorative member 20, in its entirety, as shown in FIG. 4, is formed in an elongated shape in a vertical direction in a state in which a widthwise dimension in a transverse direction is reduced, and has a desired shape which slightly curves in the forward and backward direction and in the transverse direction from an upper end part toward a lower end part thereof.

This second decorative member 20 is designed so as to be mounted and fixed to the first decorative member 10 by being aligned with respect to the mounting portion 12 of the first decorative member 10 and then pushed from a front side, whereby, via the first decorative member 10, the second decorative member is indirectly mounted and fixed to the steering main body 2. In this case, the second decorative member 20 is formed so as to exhibit a color different from that of the first decorative member 10, for example, whereby a design property of the steering wheel 1 can be enhanced.

This second decorative member 20 has a second decorative main body portion 21 which is formed in the shape of a thin plate, and which is elastically deformable; four engaging fixed piece portion (a claw portion) 25, each of which is provided in a claw shape on a back face side of the second main body portion 21; three L-shaped protrusion piece portion 26, each of which is protrusively provided on the back face side of the second decorative main body portion 21; a first plate-shaped protrusion piece portion 27 which is perpendicularly provided on the back face side of an upper end part of the second decorative main body portion 21; and a second plate-shaped protrusion piece portion 28 which is perpendicularly provided on a back face side of a substantial center part of a vertical direction in the second decorative main body portion 21.

The second decorative main body portion 21 has: a thin plate piece portion 22 which constitutes a face in such a manner as to be continuous to a surface of the first decorative main body portion 11 of the first decorative member 10 when the steering wheel 1 is constructed; and an opposite plate piece portion 23 which is extensively provided from the thin plate piece portion 22 via a curved portion, and which constitutes a face on a side opposing to a pad portion.

In addition, a surface of the second decorative main body portion 21 is a face on a side which is exposed to the outside when the second decorative member 20 is mounted and fixed to the first decorative member 10, and is formed in a smooth face so that a good sense of touch can be felt. Further, a plurality of positioning protrusion portions 24, each of which can be engaged into an engaging recessed portion and an engaging hole portion, although not shown, which are formed in the first decorative member 10, are provided on a side end face which is an opposite side to a side coming into continuous contact with the thin plate piece portion 22 of an opposite plate piece portion 23.

The four engaging fixed piece portions 25 in the second decorative member 20 each are provided at intervals which are substantially equal to each other in a vertical direction so as to correspond to a position of a respective one of the engaging fixed portion 15 that are formed on the first decorative member 10. In this case, the four engaging fixed piece portions 25 are referred to as a first engaging fixed piece portion 25a to a fourth engaging fixed piece portion 25d in sequential order from the engaging fixed piece portion 25 that is arranged on the uppermost side toward a lower side.

A respective one of the first engaging fixed piece portion 25a to the fourth engaging fixed piece portion 25d has a fixing piece main body portion which is protrusively provided in a transverse direction from a back face of the opposite plate piece portion 23 in the second decorative main body portion 21; and one pair of reinforcement portions which are formed on a back face side of the fixing piece main body portion, and each of these piece portions is constructed so as to be hooked and engagingly fitted to the engaging fixed portion 15 (an engaging fixed hole portion or an engaging fixed recessed portion) of the first decorative member 10.

The three L-shaped protrusion piece portions 26 in the second decorative member 20 are respectively arranged in proximity to an upper side of the second engaging fixed piece portion 26b, in proximity toward a lower side of the third engaging fixed piece portion 25c, and in proximity toward a lower side of the fourth engaging fixed piece portion 25d so as to correspond to positions of the respective L-shaped groove portions 16 that are formed in the first decorative member 10. In addition, each of the L-shaped protrusion piece portions 26 is protrusively provided so that a cross section which is orthogonal to the forward and backward direction forms a substantial L-shape from a back face of the second decorative member 20 toward a rear side.

In this case, each of the L-shaped protrusion piece portions 26 is formed in an L-shape by: a lateral piece portion which is formed along a widthwise direction of the second decorative main body portion 21; and a longitudinal piece portion which are formed in a lengthwise direction of the second decorative main body portion 21, and in particular, the L-shaped protrusion piece portion 26 that is in proximity to the second engaging fixed piece portion 25b is formed in an L-shape in an orientation to an extent such that the longitudinal piece portion extends from the lateral piece portion toward a upward side. On the other hand, the L-shaped protrusion piece portion 26 that is in proximity to the third engaging fixed piece portion 25c and the L-shaped protrusion piece portion 26 that is in proximity to the fourth engaging fixed piece portion 26d each are formed in an L-shape in an orientation to an extent such that a longitudinal piece portion extends from a lateral piece portion to an upper side thereof.

Therefore, the L-shaped protrusion piece portion 26 that is in proximity to the second engaging fixed piece portion 25b that is arranged at an upper halve portion of the second decorative member 20; the L-shaped protrusion piece portion 26 that is in proximity to the second engaging fixed piece portion 25c that is arranged at a lower halve portion of the second decorative member 20; and the L-shaped protrusion piece portion 26 that is in proximity to the second engaging fixed piece portion 25d are disposed in an orientation to an extent such that their respective L-shapes face to each other.

The first plate-shaped protrusion piece portion 27 in the second decorative member 20 is protrusively provided in proximity to an upper side of the first engaging fixed piece portion 25a from a back face of the second decorative member 20 toward a rear side so as to correspond to a position of the first insertion hole portion 17 that is formed in the first decorative member 10. In addition, a cross section which is orthogonal to the forward and backward direction in this first plate-shaped protrusion piece portion 27 forms an elongated rectangular shape in a lengthwise direction of the second decorative main body portion 21.

The second plate-shaped protrusion piece portion 28 in the second decorative member 20 is protrusively provided at a neutral position between the second engaging fixed piece portion 25b and the third engaging fixed piece portion 25c from a back face of the second decorative member 20 to a rear side thereof so as to correspond to a position of the second insertion hole portion 18 that is formed in the first decorative member 10. In particular, this second plate-shaped protrusion piece portion 28 is arranged at a substantial center part of the forward and backward direction in the second decorative member 20.

In addition, a cross section which is orthogonal to the forward and backward direction of the second plate-shaped protrusion piece portion 28 forms an elongated rectangular shape in the widthwise direction of the second decorative main body portion 21. Further, a tip end part (a rear end part) of the second plate-shaped protrusion piece portion 28 has a tapered shape with its roundness to an extent such that a dimension in a substantially transverse direction gradually decreases toward a rear end of the second plate-shaped protrusion piece portion 28.

It is to be noted that in the present invention, the number of formations and arrangement positions of the engaging fixed portion 15, the L-shaped groove portion 16, and the second insertion hole portion 18 that are provided in the mounting portion 12 of the first decorative member 10, or alternatively, the number of formations and arrangement positions of the engaging fixed piece portion 25, the L-shaped protrusion piece portion 26, and the second plate-shaped protrusion piece portion 28 that are provided in the second decorative member 20 can be arbitrarily changed according to the size or shape of the first and second decorative members 10, 20.

In addition, in a case where the second decorative member 20 having the constituent elements as described above is mounted and fixed to the mounting portion 12 of the first decorative member 10, the second decorative member 20 is first alighted and temporarily held (set) on a front face of the mounting portion 12 of the first decorative member 10.

At this time, the positions of the engaging fixed piece portion 25, the L-shaped protrusion piece portion 26, and the first and second plate-shaped protrusion piece portions 27, 28 of the second decorative member 20 are respectively aligned with the positions of the engaging fixed portion 15, the L-shaped groove portion 16, and the first and second insertion hole portions 17, 18 in the mounting portion 12 of the first decorative member 10; and the L-shaped protrusion piece portion 26 and the first and second plate-shaped protrusion piece portions 27, 28 of the second decorative member 20 are respectively inserted into the L-shaped groove portion 16 and the first and second insertion hole portions 17, 18 of the first decorative member 10. In this manner, the second plate-shaped protrusion piece portion 28 is positioned with respect to the first plate-shaped protrusion piece portion 27.

After the second decorative member 20 has been aligned and temporarily held with respect to the first decorative member 10, the second decorative member 20 is pushed on a rear side toward the mounting portion 12 of the first decorative member 10. At this time, the second decorative member 20 is partially strongly pushed so that each of the engaging fixed piece portions 25 of the second decorative member 20 is engagingly fitted to each of the engaging fixed portions 15 of the first decorative member 10.

Figure 7:
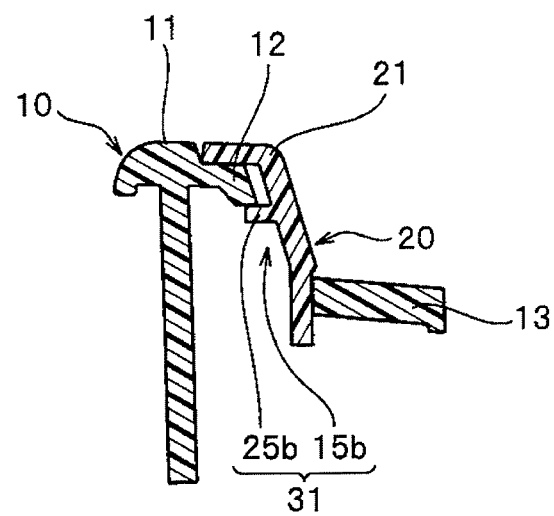
FIG. 7 is a sectional view showing a cross section taken along the line VII-VII shown in FIG. 2.
Figure 8:
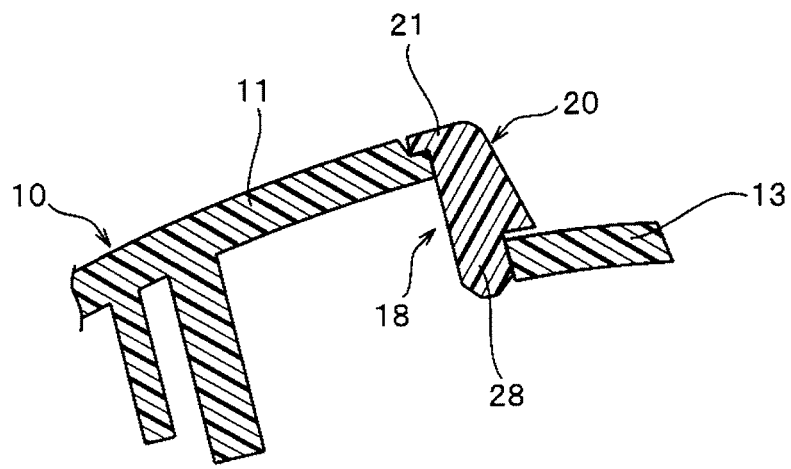
FIG. 8 is a sectional view showing a cross section taken along the line VIII-VIII shown in FIG. 2.
Figure 9:
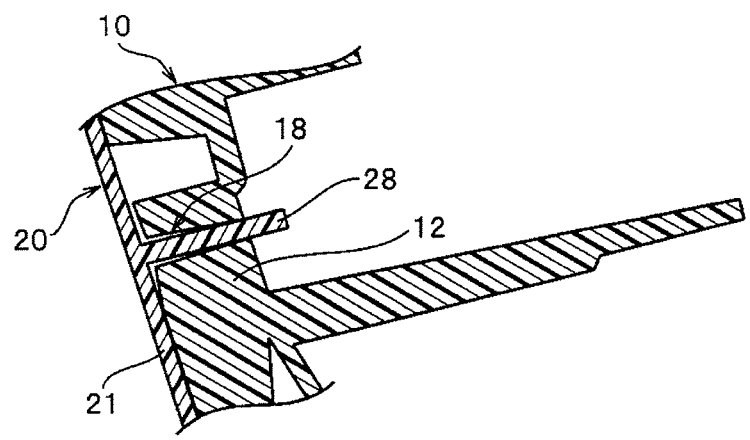
FIG. 9 is a sectional view showing a cross section taken along the line IX-IX shown in FIG. 2.
Figure 10:
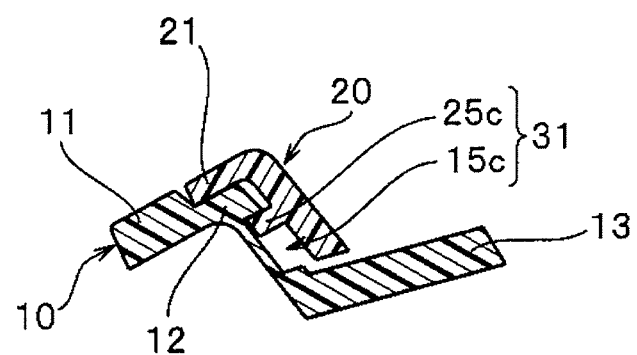
FIG. 10 is a sectional view showing a cross section taken along the line X-X shown in FIG. 2.
Figure 11:
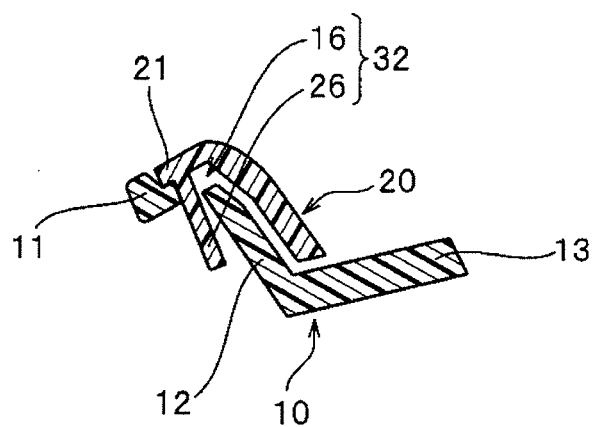
FIG. 11 is a sectional view showing a cross section taken along the line XI-XI shown in FIG. 2.
Figure 12:
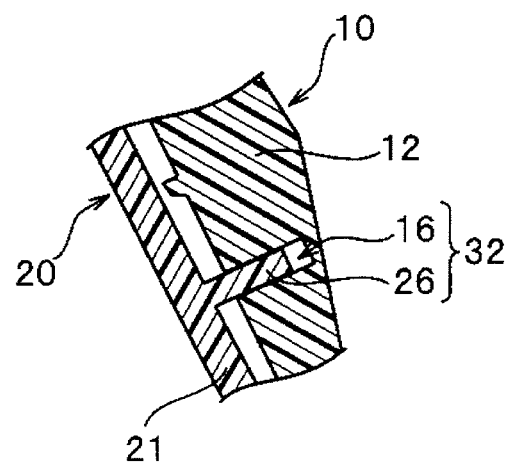
FIG. 12 is a sectional view showing a cross section taken along the line XII-XII shown in FIG. 2.

In this manner, the L-shaped protrusion piece portion 26 of the second decorative member 20 is deeply inserted into the L-shaped groove portion 16 of the first decorative member 10 (reference should be made to FIG. 5, FIG. 6, FIG. 11, and FIG. 12), and the first and second plate-shaped protrusion piece portions 27, 28 of the second decorative member 20 are respectively deeply inserted into the first and second insertion hole portions 17, 18 of the first decorative member 10 (reference should be made to FIG. 8 and FIG. 9). In addition, at the same time, the first engaging fixed piece portion 25a to the fourth engaging fixed piece portion 25d of the second decorative member 20 are respectively engagingly fitted to the first engaging fixed portion 15a to the fourth engaging fixed portion 15d of the first decorative member 10 (reference should be made to FIG. 7 and FIG. 10). In this manner, the first decorative member 10 and the second decorative member 20 are assembled and fixed to each other.

In the first and second decorative members 10, 20 thus fixed, the first engaging fixed piece portion 25a to the fourth engagingly fitting and fixing piece 5d of the second decorative member 20 are respectively engagingly fitted to the first engaging fixed portion 15a to the fourth engaging fixed portion 15d of the first decorative member 10, whereby a forward and backward direction restraining portion (a mounting and demounting direction restraining portion) 31 configured to restrain a movement of the second decorative member 20 in the forward and backward direction is constructed. In addition, each of the L-shaped protrusion piece portions 26 of the second decorative member 20 is inserted into each of the L-shaped groove portions 16 of the first decorative member 10, and the first plate-shaped protrusion piece portion 27 of the second decorative member 20 is inserted into the first insertion hole portion 17 of the first decorative member 10, whereby an orthogonal direction restraining portion 32 configured to restrain a movement of the second decorative member 20 in a direction which is orthogonal to the forward and backward direction is constructed.

Further, in the first embodiment, as described previously, each of the L-shaped groove portions 16 of the first decorative member 10 that constitutes the orthogonal direction restraining portion 32 and each of the L-shaped protrusion piece portions 26 of the second decorative member 20 are respectively disposed in proximity to each of the second engaging fixed portion 15b to the fourth engaging fixed portion 15d of the first decorative member 10 that constitutes the forward and backward direction restraining portion 31 and each of the second engaging fixed piece portion 25b to the fourth engaging fixed piece portion 25d of the second decorative member 20. Furthermore, the first insertion hole portion 17 of the first decorative member 10 that constitutes the orthogonal direction restraining portion 32 and the first plate-shaped protrusion piece portion 27 of the second decorative member 20 are respectively arranged in proximity to the first engaging fixed portion 15 of the first decorative member 10 that constitutes the forward and backward direction restraining portion 31 and the first engaging fixed piece portion 25a of the second decorative member 20. Thus, each of the forward direction restraining portions 31 and each of the orthogonal direction restraining portions 32 interact therewith. That is, in so far as the first engaging fixed piece portion 25a to the fourth engaging fixed piece portion 25d of the second decorative member 20 are concerned, the movement in a direction which is orthogonal to the forward and backward direction is restrained by way of action of the orthogonal direction restraining portion 32.

On the other hand, in so far as each of the L-shaped protrusion piece portions 26 and the first plate-shaped protrusion piece 27 of the second decorative member 20 is concerned, the movement in the forward and backward direction (in the mounting and demounting direction) is restrained by way of action of the forward and backward direction restraining portion 31. Therefore, in a region in which the second engaging fixed piece portion 25b to the fourth engaging fixed piece portion 26d and the L-shaped protrusion piece portion 26 of the second decorative member 20 are arranged, or alternatively, in a region in which the first engaging fixed piece portion 25a and the first plate-shaped protrusion piece portion 27 of the second decorative member 20 are arranged, demounting of the second decorative member 20 from the first decorative member 10 is restrained by way of an engaging fixed unit (an engagingly fitting structure) which is made of the forward and backward direction restraining portion 31 and the orthogonal direction restraining portion 32.

In addition, the second plate-shaped protrusion piece portion 28 that is arranged at a substantial center part of the forward and backward direction in the second decorative member 20 is inserted into the second insertion hole portion 18 of the first decorative member 10, thereby engaging with the second insertion hole portion 18, and a movement of the second decorative member 20 in a direction which is orthogonal to the forward and backward direction with respect to the first decorative member 10 can be restrained. In this manner, displacement of a relative position of the second decorative member 20 or local bending of the elongated second decorative member 20 is prevented, and a fixed state between the first decorative member 10 and the second decorative member 20 can be stably maintained.

It is to be noted that in such an engaging unit (an engaging structure) which is made of the second plate-shaped protrusion piece portion 28 of the second decorative member 20 and the second insertion hole portion 18 of the first decorative member 10, the movement of the second decorative member 20 in the forward and backward direction is permitted, and the second decorative member 20 is caused to removably engage with the first decorative member 10. Thus, in a case where a region in which the second plate-shaped protrusion piece 28 of this second decorative member 20 has been arranged is subjected to a force applied in a direction which is spaced from the first decorative member 10, for example, the region is locally elastically deformed, and is capable of moving so as to be spaced from the first decorative member 10.

In addition, as described above, the first decorative member 10 to which the second decorative member 20 has been assembled is aligned so as to cover the left and right spoke portions 5 and then is mounted to the steering main body 2, and further, is fixed by employing screws or the like, as shown in FIG. 1, after an operating portion, although not shown, of a variety of vehicle-mounted devices, has been attached to each of opening portions 11a that are formed in the first decorative member 10.

It is to be noted that in the present invention, at the time of assembling the steering wheel 1, for example, it is also possible to mount and fix the first decorative member 10 to the steering main body 2 and then assemble the second decorative member 20 to the first decorative member 10.

After that, an airbag device and a pad portion, although not shown, are mounted to the steering main body 2 to which the first and second decorative members 10, 20 have been mounted, whereby the steering wheel 1 of the first embodiment can be obtained.

In so far as the steering wheel 1 of the first embodiment that has been assembled as described above is concerned, the second decorative member 20 that is formed in an elongated shape can be easily mounted and fixed to the first decorative member 10 without a need to employ fixing parts such as screws or machine screws by way of the engaging fixed unit (the engagingly fitting structure) that is provided with the forward and backward direction restraining portion 31 and the orthogonal direction restraining portion 32, or alternatively, by way of the engaging unit (the engaging structure) exerted by the second insertion hole portion 18 of the first decorative member 10 and the second plate-shaped protrusion piece portion 28 of the second decorative member 20.

Thus, in so far as the steering wheel 1 of the first embodiment is concerned, in comparison with a case in which the second decorative member 20 is fixed to the first decorative member 10 by employing fixing parts such as screws or machine screws, for example, the number of parts can be reduced, and the assembling work of the steering wheel 1 can be easily and efficiently carried out. As a result, reduction of the manufacturing costs in the steering wheel 1 can be achieved.

Further, in so far as the steering wheel 1 of the first embodiment is concerned, there is no need to provide a mounting portion for mounting screws or machine screws or the like to the second decorative member 20 and thus the second decorative member 20 can be easily designed in the desired elongated shape as described above. The second decorative member 20 that is formed in such an elongated shape is mounted to the first decorative member 10, whereby a difference in color between the first decorative member 10 and the second decorative member 20 can be clearly protruded, and it becomes possible to impart a sharp and sophisticated image to the steering wheel 1 and thus an appearance quality of the steering wheel 1 can be remarkably improved.

Furthermore, in so far as the second decorative member 20 of the first embodiment is concerned, a fixing strength of the second decorative member 20 with respect to the first decorative member 10 is ensured by the engaging fixed unit described previously. Still furthermore, in addition to this engaging fixed unit, the engaging unit is constructed at a substantial center part of the vertical direction of the second decorative member 20, whereby the fixed state of the second decorative member 20 with respect to the first decorative member 10 can be maintained.

In particular, in the first embodiment, the engaging fixed units utilizing the engaging fixed piece portion 25 of the second decorative member 20 and the engagingly fitting portion 15 of the first decorative member 10 are respectively provided at an upper end part and a lower end part of the second decorative member 20, and each of the engaging fixed piece portions 25 of the second decorative member 20 and each of the engaging fixed piece portions of the first decorative member 10 are arranged at intervals which are substantially equal to each other in a vertical direction.

In this manner, when the steering wheel 1 is deformed while the wheel is subjected to an input of a load by a driver or the like from a driver's seat at the time of collision of an automobile or the like, for example (in particular, when a load is input to a lower half portion of the steering wheel 1), this steering wheel can be deformed so as to follow deformation of the steering main body 2 and the first decorative member 10.

In particular, in the first embodiment, the L-shaped protrusion piece portion 26 of the second decorative member 20 that constitutes the engaging fixed unit is formed so that orientations of the L-latters face each other around the center part of the vertical direction (in other words, so that the longitudinal piece portion is arranged at the center part's side in the vertical direction with respect to the lateral piece portion). In this manner, for example, even if the second decorative member 20 is deformed so that a lower end part of the second decorative member 20 moves to a rear side thereof with deformation of the steering main body 2 and the first decorative member 10, the second decorative member 20 can be deformed so as to follow deformation of the first decorative member 10.

Moreover, in this case, the engaging unit that is made of the second insertion hole portion 18 of the first decorative member 10 and the second plate-shaped protrusion piece portion 28 of the second decorative member 20 is provided at a substantial center part of the vertical direction of the second decorative member 20. This substantial center part of the second decorative member 20 at which the engaging unit has been provided is sandwiched between the second engaging fixed piece portion 25b and the third engaging fixed piece portion 25c of the second decorative member 20, and serves as a site configured to produce the bending deformation as described above, of the second decorative member 20.

Therefore, the engaging unit configured to removably engage the second plate-shaped protrusion piece portion 28 therewith is provided on such a site configured to actively produce such a bending deformation of the second decorative member 20, whereby when the second decorative member 20 is deformed so as to follow deformation of the first decorative member 10, the second decorative member 20 can be smoothly and flexibly deformed without restraining demounting of the second plate-shaped protrusion piece portion 28 of the second decorative member 20 from the second insertion hole portion 18 of the first decorative member 10.

In this manner, at the time of deformation of the steering wheel 1, a load input to the second decorative member 20 can be effectively released, and deformation of the steering main body 2 or the first decorative member 10 by the second decorative member 20 can be prevented from being restrained, making it possible to effectively absorb an impact.

Further, in the first embodiment, the engaging fixed units utilizing the engaging fixed piece portion 25 of the second decorative member 20 and the engagingly fitting portion 15 of the first decorative member 10 are provided at the upper end part and the lower end part of the second decorative member 20, and thus, an impact can be absorbed more effectively at the time of deformation of the steering main body 2 and the first decorative member 10.

What is claimed is:

1. A steering wheel, comprising:

a steering main body coupled to a steering shaft; and at least one decorative member mounted and fixed to an occupant opposite face side of the steering main body to cover a part of the steering main body, wherein the decorative member has a shape constructed to be deformable due to a load, and is mounted and fixed via a fixing unit to the steering wheel main body's side in a mounting and demounting direction which is substantially orthogonal to a steering face of the steering main body, the fixing unit has a plurality of engaging fixed units by which demounting of the decorative member is restrained at a time of deformation of the decorative member and an engaging unit by which demounting of the decorative member is disallowed to be restrained at the time of deformation of the decorative member, and the engaging unit is sandwiched between at least two of the plurality of engaging fixed units, and is arranged on a site on which the decorative member bends when the load is input to the steering main body and a deformation of the decorative member occurs.

2. The steering wheel according to claim 1, wherein at least one of the plurality of engaging fixed units comprises:

a mounting and demounting direction restraining portion configured to restrain at least a movement of the decorative member in the mounting and demounting direction; and an orthogonal direction restraining portion arranged in proximity to the mounting and demounting direction restraining portion, and configured to restrain the movement of the decorative member in the mounting and demounting direction.

3. The steering wheel according to claim 2, wherein the mounting and demounting direction restraining portion is comprised of:

an engaging fixed piece portion protrusively provided toward the decorative member in a direction orthogonal to the mounting and demounting direction; and an engaging fixed recessed portion or an engaging fixed hole portion formed on the steering main body's side, and configured to hook and engagingly fit the engaging fixed piece portion.

4. The steering wheel according to claim 2, wherein the orthogonal direction restraining portion is comprised of:

an L-shaped protrusion piece portion forming in a cross section in a direction orthogonal to the mounting and demounting direction; and an L-shaped groove portion punched on the steering main body's side, and configured to engage the L-shaped protrusion piece portion therein.

5. The steering wheel according to claim 1, wherein the engaging unit is comprised of:

a plate-shaped protrusion piece portion which protrudes from an opposite face opposing to the steering main body of the decorative member toward the steering main body; and a hole portion punched on the steering main body's side, and by which demounting of the plate-shaped protrusion piece portion in the mounting and demounting direction is disallowed to be restrained.

* * * * *